US008806363B1

(12) United States Patent
Sonawala (10) Patent No.: US 8,806,363 B1
(45) Date of Patent: Aug. 12, 2014

(54) FRAMED USER INTERFACE

(75) Inventor: Jinesh Sonawala, San Jose, CA (US)

(73) Assignee: Google Inc., Mountain View, CA (US)

( * ) Notice: Subject to any disclaimer, the term of this patent is extended or adjusted under 35 U.S.C. 154(b) by 1219 days.

(21) Appl. No.: 11/283,711

(22) Filed: Nov. 22, 2005

(51) Int. Cl.
*G06F 3/048* (2013.01)

(52) U.S. Cl.
USPC .......................... 715/779; 715/835; 715/840

(58) Field of Classification Search
USPC ......... 715/744, 779, 810, 835, 273, 763, 825, 715/840; 707/E17.111, E17.142; 719/328
See application file for complete search history.

(56) References Cited

U.S. PATENT DOCUMENTS

| | | | | |
|---|---|---|---|---|
| 5,644,737 | A * | 7/1997 | Tuniman et al. | 715/810 |
| 5,757,371 | A * | 5/1998 | Oran et al. | 715/779 |
| 6,072,486 | A * | 6/2000 | Sheldon et al. | 715/835 |
| 6,239,798 | B1 * | 5/2001 | Ludolph et al. | 715/788 |
| 6,613,100 | B2 * | 9/2003 | Miller | 715/273 |
| 6,630,943 | B1 * | 10/2003 | Nason et al. | 715/746 |
| 6,832,381 | B1 * | 12/2004 | Mathur et al. | 719/328 |
| 7,010,755 | B2 * | 3/2006 | Anderson et al. | 715/778 |
| 7,240,296 | B1 * | 7/2007 | Matthews et al. | 715/840 |

* cited by examiner

*Primary Examiner* — Robert Stevens
*Assistant Examiner* — Andrew Tank
(74) *Attorney, Agent, or Firm* — Morgan, Lewis & Bockius LLP (57) ABSTRACT

A framed user interface operating on a computer or similar system may allow a user to select certain interactive instances contained within the framed user interface. The user of the computer system may modify the framed user interface to suit individual or group preferences. The user may select the user interactive instances through the framed user interface and then the framed user interface may act on that selection. Once selected, the user interactive instance may be available in a workspace area for user manipulation. The framed user interface may allow for logical organization of various types of user instances available on a typical computer or consumer electronics platforms. It also may enable ready-availability of certain user interactive instances and instant startup by having them perennially loaded in a random access memory and executable without the need to be later launched or initiated from permanent memory.

19 Claims, 5 Drawing Sheets

FRAMED USER INTERFACE

FIELD OF THE INVENTION

Embodiments of the present invention relate to user interfaces and to graphical user interfaces (GUI) that serve as borders framing the display of a personal computer system, and the use thereof.

BACKGROUND OF THE INVENTION

Graphical User Interfaces (GUIs) compatible with various Operating Systems (OS) serve to create an environment where applications may be selected and opened through typical graphical user interaction. Among other ways, users are able to manage and execute applications using a "point-and-click" method on objects shown on the computer display.

The GUI background is commonly referred to as the "desktop" or workspace, and "objects" are typically displayed on the desktop. Opened applications or objects may also be represented by a graphical icon located in the viewable area of current "toolbars," or in toolbox displays within the viewable area of a screen. Users of leading OS providers typically locate toolbars at the bottom of the viewable screen area or to one side. By clicking on the graphical icons in a toolbar a user may switch between applications viewable in the workspace. However, this can get quite unwieldy especially when numerous applications are opened and running simultaneously.

Many of these OSs and applications use menus such as the "Microsoft Start Menu" and other forms of hierarchical menus that have files, programs and software utilities grouped together in a manner that may result in dysfunctional user interaction. Further, once a menu is opened, a hierarchical menu has to be opened, and another hierarchical menu may need to be opened before the desired file or utility can be opened. These and other drawbacks exist with current systems.

SUMMARY OF THE INVENTION

Accordingly, various exemplary embodiments of the present inventions may be directed to a system and method for creating a framed user interface containing user interactive instances. Modification of the framed user interface through a modification module according to user preference may be possible. Selection of user interactive instances through a selection module may occur and the framed user interface may act on that selection. In one exemplary embodiment, a plurality of the user interactive instances are initiated during a start up and become available through the framed user interface for immediate access through a random access memory. The framed graphical user interface may be arranged in a plurality of sections.

According to a further exemplary embodiment of the invention, a method may include interaction with a computer system by presenting a framed user interface arranged in a plurality of sections, receiving a selection of a user interactive instance contained in the framed user interface, and acting on the selection.

According to a further exemplary embodiment of the invention, a method may include interaction with a computer system comprising receiving a selection of a user interactive instance contained in a framed user interface arranged in a plurality of sections, modifying the framed user interface according to user preference, acting on the selection of the user interactive instance, and switching between user interactive instances within the framed user interface.

Other embodiments may be considered.

DETAILED DESCRIPTION OF EXEMPLARY EMBODIMENT(S)

Exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

Some embodiments of the present invention provide a framed user interface and method for using the framed user interface within a computer system. In these exemplary embodiments, a user computer system may incorporate a framed user interface as a method of efficiently opening, selecting, or switching between certain user interactive instances within an OS. An embodiment of the invention allows for immediate user selection of user interactive instances from a single framed GUI. Other embodiments contemplate tiered or multiple framed GUIs that may allow for nearly immediate user selection of user interactive instances and the ability to navigate between framed GUIs. The framed user interfaces contemplated within the embodiments are compatible with numerous computer and operating systems.

The framed user interfaces may operate in conjunction with known OSs or independently. Within a computer system framework, the framed user interface allows a user to customize his or her desktop work environment to achieve efficiency and functionality for the individual user based upon individual or group needs. Users may also have the ability to select a number of predetermined configurations that organize user interactive instances appearing on the framed user interfaces. The user interactive instances, for example, may be represented within the framed user interfaces as icons or other graphical representations as chosen by the user. The user interactive instances may also be represented by audio or keyboard inputs, or any other method of user interaction that permits selection. In referring to certain embodiments of a framed graphical user interface as containing user interactive instances, this refers broadly to either the graphical user interfaces being represented on or within the framed user interface, or the user interactive instances being executable from the framed user interface, or any combination thereof.

The framed user interfaces may offer a computer system user customization and application accessibility that currently do not exist. Within the scope of the framed user interface, a user may optimize his or her work environment by organizing select user interactive instances, or applications, into sections of the framed user interface. By doing so, a user may group user interactive instances into sections of the framed user interface that achieve the best results for the individual user, such as by arranging sections according to types of applications. A user, under this exemplary embodiment, may then access and manipulate applications by simple user selection of a graphical icon, for instance, located at some position along a section of the framed user interface. A user may thereafter select a particular application along a preferred position within the framed user interface without the need to close open windows, go through hierarchal menus, or wade through a myriad of toolbar icons that may be unrecognizable. A user may quickly switch between applications by selecting a graphical icon representing each application. Under one embodiment, by positioning a graphical icon representing a user interactive instance at the same position along a frame section, and by arranging sections of the frame according to the type of user interactive instance, a user may achieve optimal direct manipulation of his or her work environment.

The development and integration of a framed user interface into the computer and operating systems may occur in numerous ways apparent to one of ordinary skill in the art. One method for creation of a framed user interface is design through a framing builder program. The framing design builder program may permit a user to choose user interactive instances to add in the framed user interface. The program may also allow users to choose organizational attributes based upon user or group preferences. In one embodiment, the program may allow users to choose graphical icons to represent user interactive instances—applications for example—on a framed GUI.

During the initiation or creation phase of a framed user interface, the user may also determine grouping arrangement criteria for grouping or organizing user interactive instances into a plurality of sections, or frames. In one embodiment, the program may then create a framed GUI with a plurality of sections based upon the user inputs. An embodiment of the invention may permit initiation of a framed user interface by a third party system administrators, so that pre-configured framed user interfaces with standard defaults for the arrangement of user interactive instances into a plurality of sections, or frames, may be created. A pre-configured user interface may also be available under some embodiments by purchasing the initiation software program in a pre-bundled configuration with user interactive instances pre-configured along framed sections.

In certain embodiments, a user may also have the ability to modify grouping arrangement criteria for user interactive instances after the initial creation of a framed user interface. This may allow continual customization based upon user preferences. User modification of the framed user interface may be accomplished by GUI inputs pursuant to one embodiment of the invention. A user, for example, may determine preferred applications to position in certain sections or quadrants of a framed GUI. A user may further modify a framed GUI by choosing "skins," or custom graphical appearances, based upon user preference. A user, under some embodiments, may also arrange sections of a framed GUI by application type, most recently accessed files, utility type, favorite links, media selections, or by any other user specified criteria apparent to one of skill in the art. By doing so, a user may produce a more efficient and functional work environment.

Users may have the ability to modify the applications present on a framed user interface based upon individual or group need. System architects or network administrators may also have the ability to design framed user interfaces for particular groups of users. This in turn may allow for efficient and immediate access of applications, for example, from a framed GUI that are determined to be valuable to the group. Thus, some degree of uniformity in certain platforms may be achieved, where desired, while maintaining the ability to quickly select and switch between applications at the individual user level.

Upon an initial startup or boot of a computer system one embodiment of the framed user interface, once initiated, may allow for immediate opening of a select number of user interactive instances contained within the framed user interface. In this embodiment, the user interactive instances are opened through and remain readily accessible through a random access memory. Random access memory refers broadly to any memory system that permits multiple user interactive instances or programming instances to be launched or executed and available for manipulation. Because these user interactive instances are already open, selecting these user interactive instances in the framed user interface through the random access memory, potentially a DRAM, may allow immediate access without the wait time typically associated with new application start up, for example. As the price of DRAM, or similar memory devices, keeps falling and as personal computers, cell phones, set top boxes, and PDA's come equipped with more and more DRAM, it is increasingly feasible to have tens of applications loaded in memory and ready to execute by simply clicking on the frame, much like a palette of paints is always available to an artist. In this embodiment, a framed user interface allows for immediate switching between user interactive instances that are already fully available and running. Select user interactive instances may be selected during the initiation phase or during a later modification to automatically launch upon system start up to achieve this capability.

Further embodiments of the invention relate to the opening of a select number of user interactive instances contained within the framed user interface into a random access memory. In certain situations the random access memory may become full or have a limited amount of space available. This may occur as a result of additional user interactive instances being later initiated or launched after start up. In certain embodiments, it may be necessary to close or to eject certain user interactive instances from the random access memory to allow for others to be activated. A user or system administrator may develop a user defined queue to determine which user interactive instances may be ejected from memory. For example, the queue may be based upon ejecting from memory the first user interactive instance that was exited, but still available for selection within the framed user interface. In this example, the first user interactive instance to be exited may be the first to be ejected from the random access memory, and the second exited may be the second ejected from the random access memory, and so on as more memory is needed to launch user interactive instances through a work session or time period. Other combinations of criteria may be adopted to address the number of user interactive instances available for immediate manipulation based upon the limiting factor of the space available within one or more random access memories being used to launch user interactive instances.

The structure of the framed user interface may largely be determined by user preferences, but under some embodiments common characteristics may be present. The framed user interfaces, in one embodiment, may be physically positioned on a typical viewing area or workspace of a computer system in such a manner as to create a viewable frame around the outer boundaries of the screen. The workspace of the computer system may then be shrunk in proportion to the size of the framed user interface surrounding the workspace. In this embodiment, the frame may be available in a plurality of sections, creating an appearance much like a picture frame around a picture. Although four sections may offer uniformity in appearance, any plurality of sections may fall within other embodiments of the framed user interface.

One embodiment of the framed user interface may be compatible with standard OS's workspace and toolbar functioning. In such an embodiment the framed user interface may occupy three sides of the workspace while leaving the remaining side available for traditional toolbar interaction under known OS platforms.

Other embodiments for nontraditional, or nonrectangular, viewing or workspace areas may be adapted accordingly to present a plurality of framed sections according to the dimensions of the workspace presented. For instance, in a circular viewing and workspace area the plurality of framed sections may be in arc sections.

In one embodiment of the framed user interface, the user interactive instances may be represented by graphical icons. These graphical icons may be positioned along the various sections of the frame according to user preference or predetermined configuration. As an example: the left section of a frame may be used for utilities such as calculator, keyboard utilities, speaker volume, and/or the like; the top frame section may be used for applications such as Word, Acrobat, and/or the like; the right section of the frame may include a set of favorite web applications and web panels including news, instant messaging, webmail, and/or the like; and, the bottom section of the frame may be used for websites visited and favorite webpages available for offline perusal. Pursuant to this embodiment it may be possible to select and have immediate access to the user interactive instances, or applications, by simply pointing-and-clicking with a mouse or other selection device. Once a user interactive instance is selected it may then be possible to obtain immediate access to other user interactive instances by pointing-and-clicking, for example, on its respective graphical icon positioned along a frame. Such interaction, under this embodiment, allows for more efficient user interaction because the need to go through hierarchal menus is eliminated. Also, user selection of a user interactive instance may occur without the need to close or reduce opened windows currently being manipulated in a workspace to find a graphical icon hidden underneath. Numerous graphical icons may be located along a single frame, while still allowing the user to identify the application represented by each.

Users of computer systems may in many instances desire to open numerous applications during a work session and then may desire to switch between applications frequently. The framed user interface may make switching between opened user interactive instances more efficient than traditional techniques. In one embodiment of the framed user interface, once a plurality of user interactive instances are opened in the workspace environment, a user may again gain immediate access to a hidden application, for example, by selecting (e.g., clicking on) its graphical icon in one of the plurality of frame sections along the workspace. By selecting a graphical icon that may remain in the same geometric position along the frame, a user is quickly able to switch between opened applications and open new user interactive instances without the need for searching a traditional toolbar for the desired selection.

The selection of user interactive instances may occur in numerous ways. For example, user interactive instances may be selected from a framed user interface by audio or keyboard inputs as opposed to point-and-click selections. The user may, for example, select an application by depressing a preset key on a keyboard, or by speaking the selection information into the computer system using a microphone, respectively. In some embodiments the user selection may occur by direct physical contact with a computer or TV screen, such as by depressing a graphical icon located along a framed section or by other input mechanisms located along a computer or TV screen. Remote control devices may also enable selection of user interactive instances under some embodiments.

While a single framed user interface offers the advantage of immediate selection of a plurality of user interactive instances positioned along the frame sections, other embodiments of the framed user interface contemplate multilayer framed user interfaces. A multilayer framed GUI, for example, may offer the advantage of more physical viewing space for graphical icons representing user interactive instances. The frame currently viewable on a screen may be changed, or selected, in a number of ways apparent to one of skill in the art. Changing frames may occur by simple user selection of a graphical icon positioned at some place along a frame or within the workspace area. A user may also have a tab system where graphical icons are layered and numbered or lettered, for example, to allow the user to select a tab corresponding to the desired frame. Switching between frames may also occur with keyboard inputs or with audio inputs corresponding to the desired frame the user wishes to select, and by all other examples discussed for selection of user interactive instances.

A multi-layered frame may also be implemented where each user interactive instance positioned along a frame section may have other user interactive instances associated with it. When such a user interactive instance is selected (e.g., clicked on) an associated "sub-frame" section may appear under the main top frame section (or to the right of the left-frame section, or to the top of the bottom frame section, or to the left of the right frame section depending on which frame the user interactive instance is associated with) showing a further subset of relevant user interactive instances associated with the primary selected user interactive. Such a sub-frame section may disappear once an action is over or when another user interactive instance in selected in the main frame. At that point another sub-frame section related to the next selected user interactive instance may appear, if a sub-frame is associated with that instance.

In other embodiments of the framed user interface, a framed user interface may become invisible or may vanish according to user preference. Such an embodiment may allow users to enjoy a full work space viewing area until a triggering or selection event may again activate the framed user interface and bring it to a position bordering the workspace. In certain embodiments the framed user interface, once selected by the user to reappear, may appear tiled over the workspace area or the framed user interface may simply shrink the workspace area and appear along its outer border.

Overview and System Architecture

Figure 1:
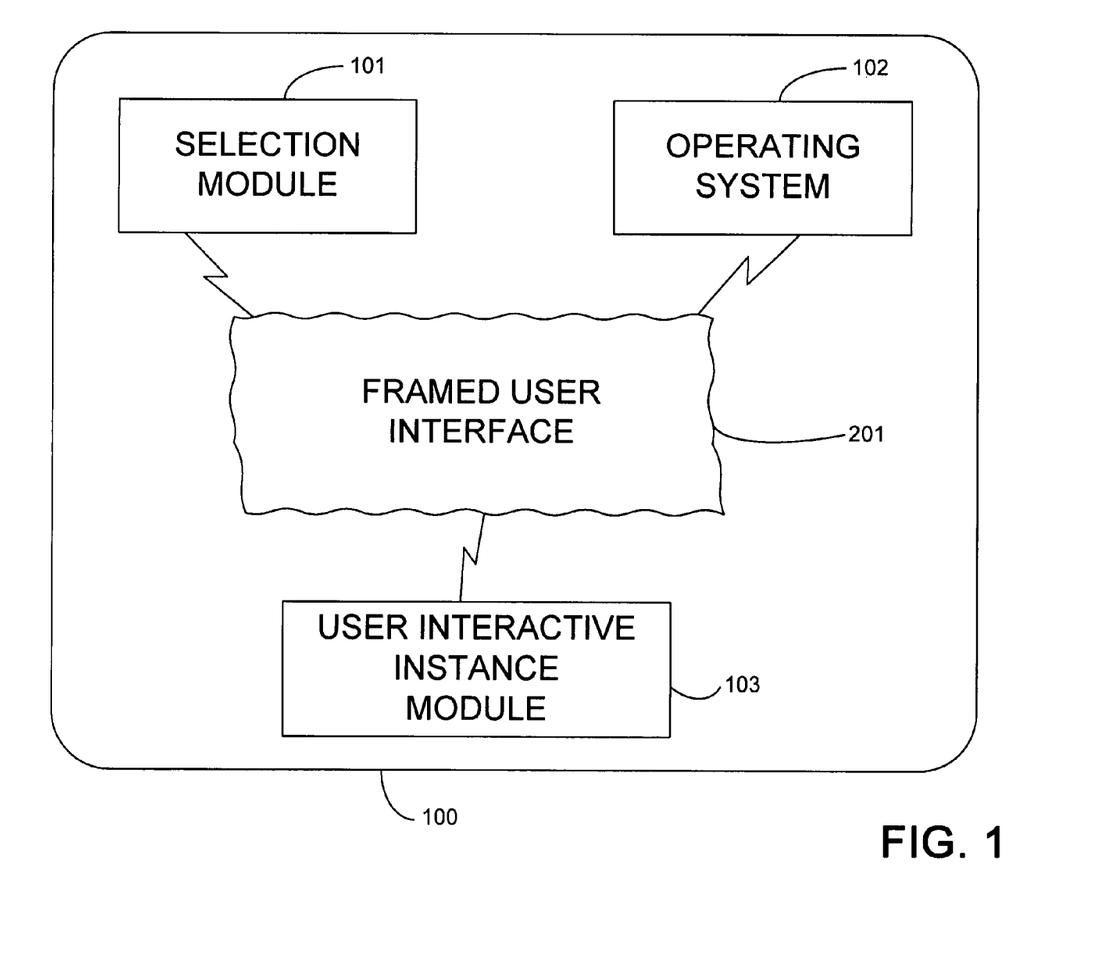
FIG. 1 depicts an exemplary computer system with a framed user interface according to an embodiment of the invention.

FIG. 1 depicts an exemplary computer system 100 incorporating a framed user interface 201 pursuant to one embodiment. Computer system 100 may include a selection module 101, an operating system 102, a user interactive instance module 103, and a framed user interface 201. A computer systems 100 may include, but is not limited to: e.g., any computer device, or communications device including, e.g., a personal computer (PC), a workstation, a mobile device, a phone, a handheld PC, a personal digital assistant (PDA), a paging, an alert device, a television, an interactive television, a receiver, a tuner, a set top box, a high definition (HD)

television, an HD receiver, a video-on-demand (VOD) system, a server, or any other device with user interfaces for selection of applications.

The term user interactive instance is a broad description meant to include, for example, software applications and their implementation, as well as OS software, files, utilities, widgets, controls, application suites or any other system or device that may be manipulated through user interfaces. User interactive instance module 103 operates to take an action upon such instances upon selection. An operating system 102 may include, for example, standard system software responsible for the control and management of hardware and basic system operations. The selection module 101 may receive selections and act on those selections in conjunction with framed user interface 201.

The operating system 102 may act in conjunction with the framed user interface 201 and the selection module 101 to initiate or switch between the user interactive instances 103. The framed user interface 201 may operate within the purview of the operating system 102, or in some embodiments the framed user interface 201 may operate independent of the operating system 102.

Figure 2:
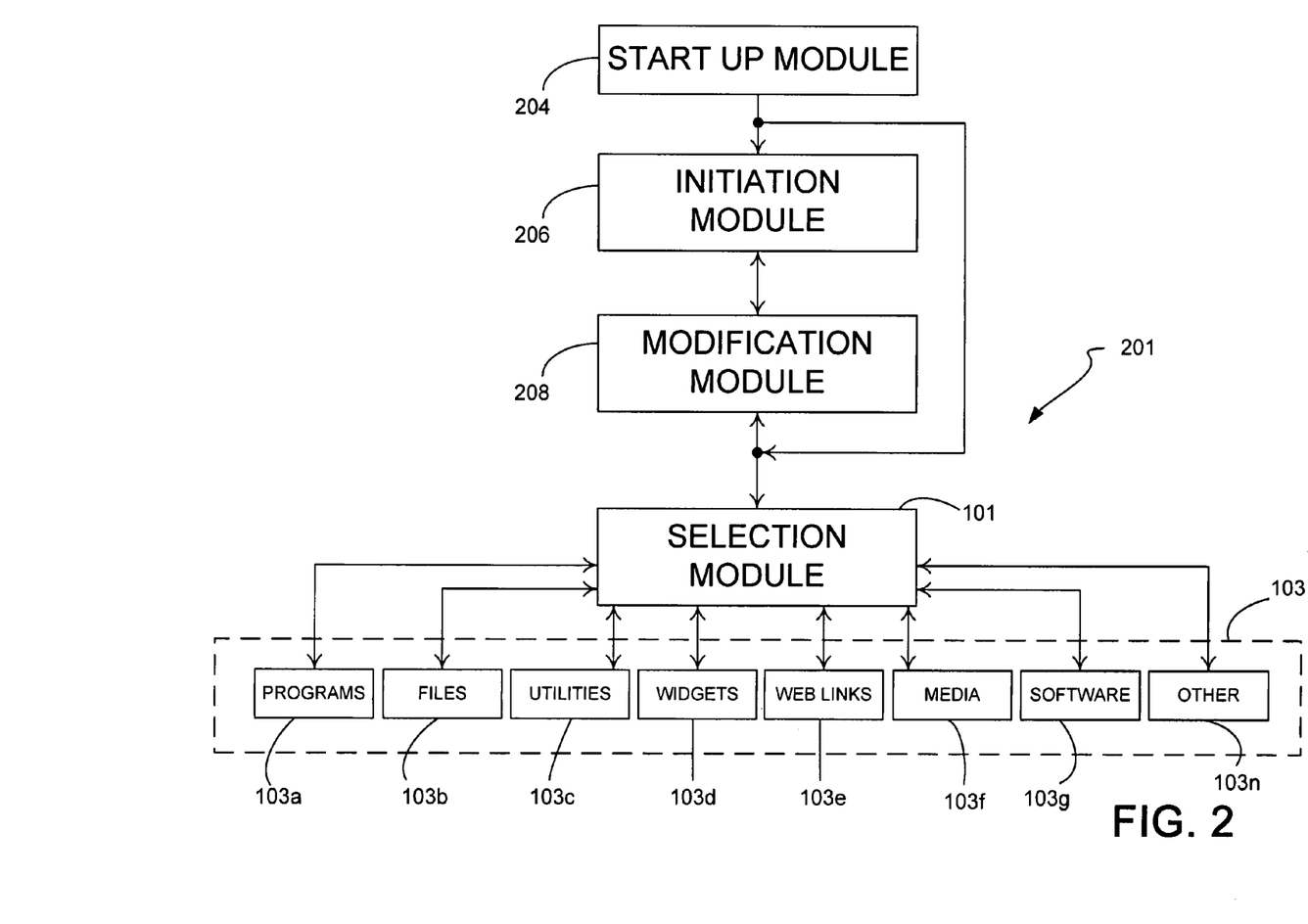
FIG. 2 depicts a framed user interface according to an embodiment of the invention.

FIG. 2 depicts an exemplary embodiment of a framed user interface 201 according to one embodiment. A start up module 204 may initiate start up of an example computer system, and/or initiate the set of operations the computer performs when it is switched on and loading an operating system. An initiation module 206 may initiate a framed user interface 201 by a user, or by incorporation of a pre-configured framed user interface 201 within a computer system. The initiation module 206 may allow for the creation of a user interface 201 through a framing design builder program contained within the initiation module 206. The framing design builder program may permit a user to configure a plurality of frame sections to surround a workspace area and to choose user interactive instances 103 to add onto the plurality of sections of the framed user interface 201. The frame builder program may also allow users to choose organizational attributes for the framed user interface 201 based upon user or group preferences.

The initiation module 206 may also allow for the creation of a framed user interface 201 through loading a pre-configured framed user interface 201 into the OS of a computer system. Such an embodiment may allow the user interactive instances 103 to be arranged according to standard defaults into a plurality of framed user interface 201 sections.

In some embodiments of the invention, once a framed user interface 201 is created, the initiation module 206 may also allow for the immediate opening into a random access memory, DRAM for example, of a select number of user interactive instances 103 that were chosen at some point to be available for selection within or on the framed user interface 201. In other embodiments the select number of user interactive instances 103 may be launched immediately into a random access memory outside the scope of the initiation module 206 through programmed configurations incorporated into an OS. In these embodiments, the user interactive instances 103 are opened through and remain readily accessible through a random access memory. Pursuant to these embodiments the selection module 101 for selecting user interactive instances 103 in the framed user interface 201 may allow immediate access to the user interactive instances 103 without the wait time typically associated with new application start up because these user interactive instances 103 are already open and readily available through a random access memory.

The modification module 208 may allow a user or system administrator to modify grouping or other arrangement criteria for user interactive instances 103 after the initial creation of a framed user interface 201. The modification module 208 permits select customization of a framed user interface 201 based upon user preferences.

The modification module 208, in one embodiment, achieves customization and modification of the framed user interface 201 through GUI inputs. A user, for example, may determine preferred graphical icons to represent user interactive instances 103 and then determine positioning of these graphical icons in certain sections or quadrants of a framed GUI 201 based upon desired criteria, such as by type of application or by frequently used applications. A user may further modify a framed GUI within the modification module 208 by choosing "skins," or custom graphical appearances.

The selection module 101 permits the opening or switching between user interactive instances 103. Examples of user interactive instances 103 are given in FIG. 2. This example includes programs 103a, files 103b, utilities 103c, widgets 103d, web links 103e, media 103f, software 103g, and other 103n user interactive instances. Generally, user interactive instances 103 in certain embodiments may include: software applications, OS software, files, utilities, widgets, databases, controls, application suites, media files or software, word processing applications, or any other system or device that may be manipulated through user interfaces.

User interactive instances 103 may be selected within the selection module 101 in a number of ways. In one embodiment, selection may occur in a framed GUI 201 through "point-and-click" selection of graphical icons representing user interactive instances 103. In other embodiments, users may also transmit audio signals to enable selection. Other embodiments contemplate that a key on a keyboard, corresponding to a user interactive instance 103, may be depressed to enable selection.

Still in other embodiments direct physical contact with a computer or TV screen, such as by depressing a graphical icon located along a framed section or by other input mechanisms located along a computer or TV screen may enable selection of a user interactive instance 103 located on or within a framed user interface 201. Remote control devices may also enable selection of user interactive instances 103 under some embodiments of the invention. In yet another embodiment, selection of user interactive instances 103 positioned in four sections along a framed user interface may occur by assigning each of the user interactive instances a keyboard key corresponding to each of the top four rows on a typical keyboard—i.e., in the first section, selection may occur by depressing keys, "1," "2," "3," etc. While selection of user interactive instances 103 in the second section may occur by depressing keys, "Q," "W," "E," etc. These examples are merely representative of the numerous potential ways, not described herein, that selection of a user interactive instance 103 may occur.

Figure 3:
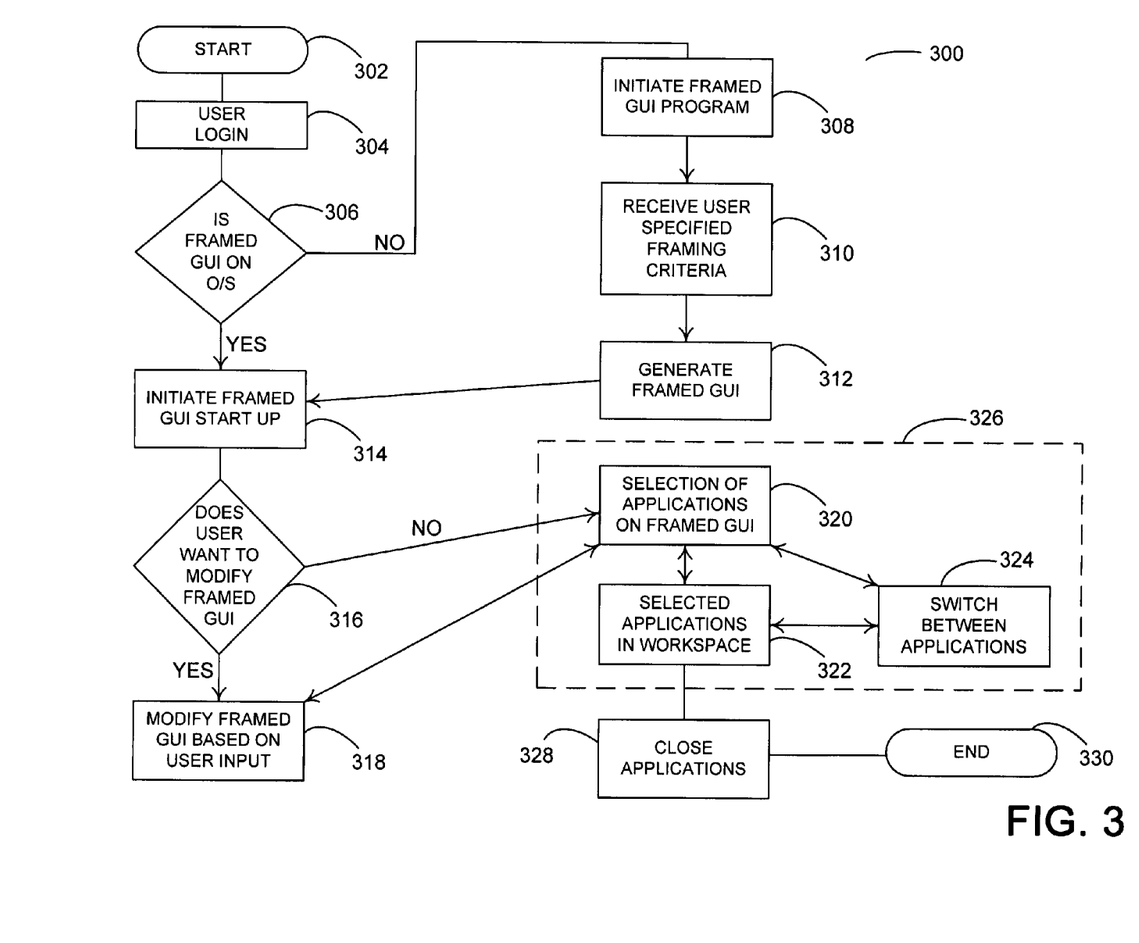
FIG. 3 illustrates a flow chart showing an exemplary method for creation and use of a framed user interface according to an embodiment of the invention.

FIG. 3 illustrates a flow chart 300 showing an exemplary method for creation, modification and use of a framed user interface according to an embodiment of the invention. One user interface in this example may be a framed GUI 326 and the user interactive instances may be referred to as applications in this instance. Flow chart 300 may begin at block 302. In block 304 a user may be prompted to input user login information. Whereas, unique framed GUIs 326 may be created for individual users possibly operating from the same work platform, the login inputs may trigger activation of a unique framed GUI 326 for an individual user.

In block 306, the user, or a prompted computer system, may decide if a framed GUI 326 is currently operating on an operating system, for example. If there are currently no framed GUIs 326 the system proceeds to block 308 and initiates a framed GUI program 308. Once initiated the frame builder program may receive specified framing criteria according to block 310. Framing criteria may range from general appearance of the framed GUI 326, such as the number of framed sections to include and whether to customize with certain skins. Block 310 may also receive criteria regarding the size and arrangement of icons representing user interactive instances, or applications, along the framed GUI 326 sections according to user preference.

Within block 310, a user may also specify which applications may be automatically launched on future start ups and immediately available for execution through a random access memory on or within a framed GUI 326. Once user specified framing criteria 310 are received the frame builder program may generate the framed GUI in block 312.

In block 314, the framed GUI 326 may be initiated or launched. After initiation of the framed GUI 314, a user may be prompted in block 316 as to whether the user wants to modify the framed GUI 326. If in block 316 a user decides to modify the framed GUI, the user is directed to block 318 wherein the framed GUI 326 may be modified based on user input. A user may wish to change which applications appear on or within a framed GUI 326, or which applications are immediately launched on start up and immediately available for manipulation.

Block 318 may receive modified grouping or other arrangement criteria for applications after the initial creation of a framed GUI 326. User modification of the framed GUI 326 may be accomplished by GUI inputs pursuant to one embodiment of the invention. A user, for example, may determine preferred applications to position in certain sections or quadrants of a framed GUI. A user, under some embodiments, may also arrange sections of a framed GUI by application type or by any other user specified criteria apparent to one of skill in the art. Modification pursuant to block 318 may also occur by the structure and methods discussed above in describing the modification module 208.

Block 318 may also receive inputs from system architects who may also have the ability to modify the applications included on or within a framed GUI 326 based upon individual or group need. System architects or network administrators may also have the ability to design framed user interfaces for particular groups of users in block 318, or within blocks 308 and 310. This in turn may allow for efficient and immediate access of applications, for example, on or within a framed GUI 326 that are determined to be important to the group. After modification inputs are received in block 318, the system may proceed into normal operation mode for the framed GUI 326.

Within the framed GUI 326, a user is may interact with the framed GUI 326 to either select applications according to block 320 to appear in the workspace environment in block 322, or to switch between applications in block 324 that are already opened or being executed. Selection of applications 320 may occur as discussed above in describing the structure and operation of the selection module 101. In the example of FIG. 3, as one embodiment, selection of applications on the framed GUI 320 may occur by pointing-and-clicking on graphical icons appearing on or within the framed GUI 326. The graphical icons appearing on or within the framed GUI 326 represent applications.

In block 324, a request may be received from a user to switch between applications that are already opened or being executed by simply single clicking, for example, on that application's graphical icon located along the framed GUI 326. By locating an application's graphical icon in the same geometric position along a section of the framed GUI, a user may quickly gain associative memory and be able to more efficiently recall applications to the workspace 322.

Once applications are selected according to block 320 or switched between according to block 324 the applications may be available according to block 322 for user interaction in a typical workspace through windows, for example. Block 324 contemplates, in certain embodiments, that on start up, or framed GUI initiation in block 314, certain selected applications may be automatically launched and henceforth available for immediate selection and manipulation. Thus, a request may be received from a user, pursuant to block 324, to quickly switch between a number of applications that are launched during start up and immediately available and operating from a random access memory, DRAM for example, that allows immediate manipulation. Switching between applications may occur by pointing-and-clicking on the applications' graphical icon, pursuant to this embodiment.

In block 328, a work session may end pursuant to a user's request and all applications operating within the framed GUI 326 may be closed. Flow chart 300 may end at block 330.

Illustrative User Interfaces

Figure 4:
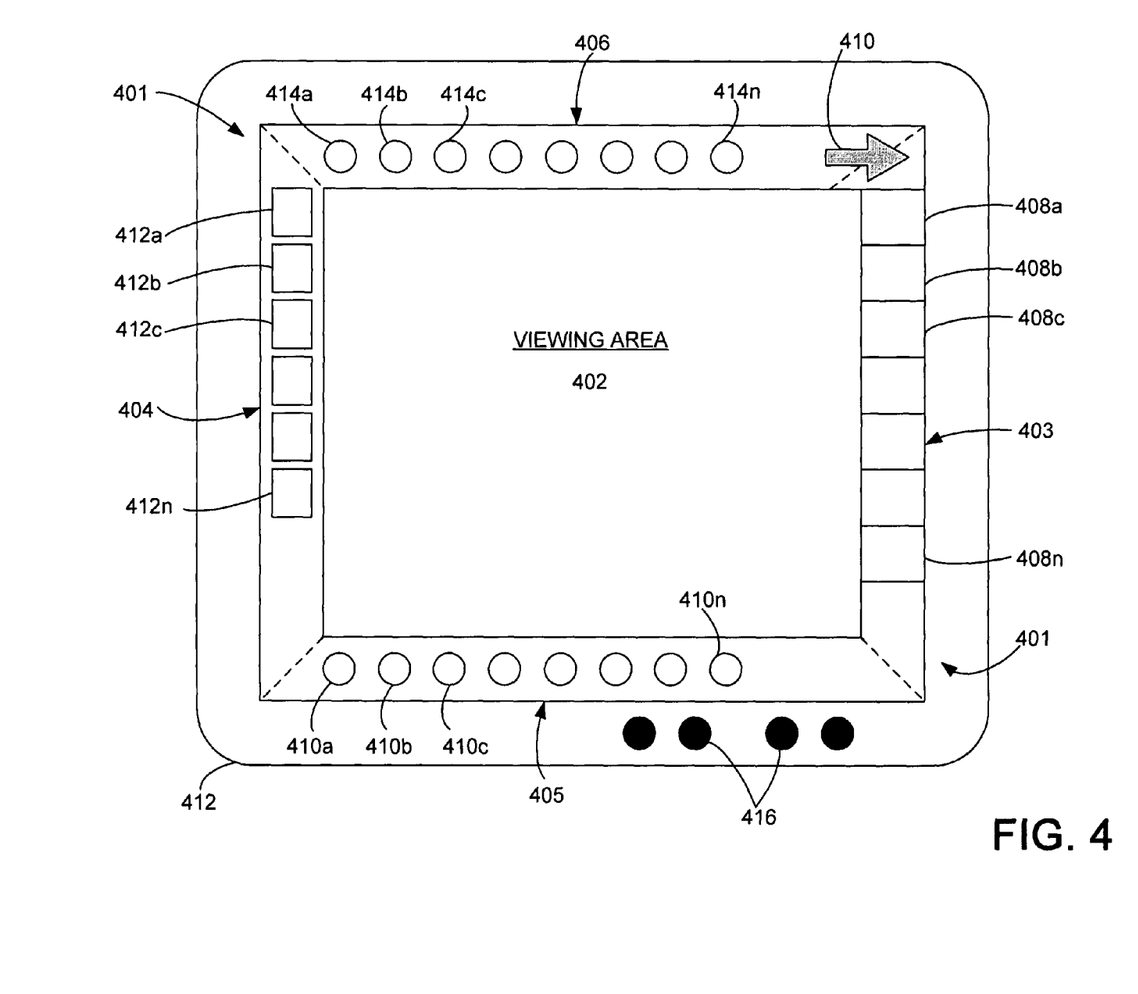
FIG. 4 illustrates an exemplary framed GUI according to an embodiment of the invention.

FIG. 4 illustrates an exemplary framed user interface 401 that may be used to select user interactive instances. The viewing area 402 represents a typical workspace environment where, once selected, user interactive instances may be manipulated. In this embodiment, the framed user interface 401 is a framed GUI comprised of a plurality of sections (e.g., 403, 404, 405, and 406) surrounding the viewing area 402. Each of the sections may contain graphical icons (e.g., 408a, 408b, 408c . . . 408n; 410a, 410b, 410c . . . 410n; 412a, 412b, 412c . . . 412n; and 414a, 414b, 414c . . . 414n) that represent the respective user interactive instances. The graphical icons 408a-n, 410a-n, 412a-n, and 414a-n may be represented by various shapes and sizes of icons based upon user preference or preset configuration. Each icon may allow immediate selection or switching between user interactive instances through pointing-and-clicking, for example. Once selected, a user interactive instance may appear in the viewing area 402 for manipulation. Some user interactive instances, such as media programs 408, may of course execute without necessarily appearing in the viewing area 402.

In one exemplary embodiment, the graphical icon 410, represents a user input to switch between multiple frames. The multiple frames, although not pictured, may be arranged in the same manner as the framed GUI 401. Each framed GUI 401 may also be arranged with a plurality of sections 403, 404, 405, and 406 for selection of graphical icons 408a-n, 410a-n, 412a-n, and 414a-n representing user interactive instances for manipulation. A user may interact with the graphical icon 410 by pointing-and-clicking, for example, or by depressing a keyboard key that may enable switching between framed GUIs.

The framed GUI 401 may be surrounded by a screen or monitor shell 412. The screen or monitor may also have direct input selections 416 that may control characteristics of the screen or monitor, such as contrast, for example. In one embodiment, the direct input selections 416 may also serve as devices for selecting user interactive instances on or within a framed GUI 401.

According to one possible embodiment, and for illustrative purposes only, a user may choose the following arrangements within FIG. 4. Within section 403 of the framed GUI 401, a user may decide to position information panels, or web panels such as news links, photos, instant messaging, daily calendar, email, and/or the like as graphical icons 408a-n along section 403. Within section 404, a user may decide to position utilities such as calculator, foreign currency converter, file compressor, anti-virus utility, and/or the like as the graphical icons 412a-n along section 404. Along the third section 405 of this example, a user may decide to position all recently visited webpages, or favorite weblinks, or other quick interne links as graphical icons 410a-n along section 405. Finally, along the fourth section 406, a user may decide to position desktop or productivity applications such as a word processor, spreadsheet, presentation application, and/or the like as graphical icons 414a-n along section 406. This arrangement is simply meant to be illustrative to demonstrate the broad possibilities of user customization possible through one embodiment of the current invention.

Figure 5:
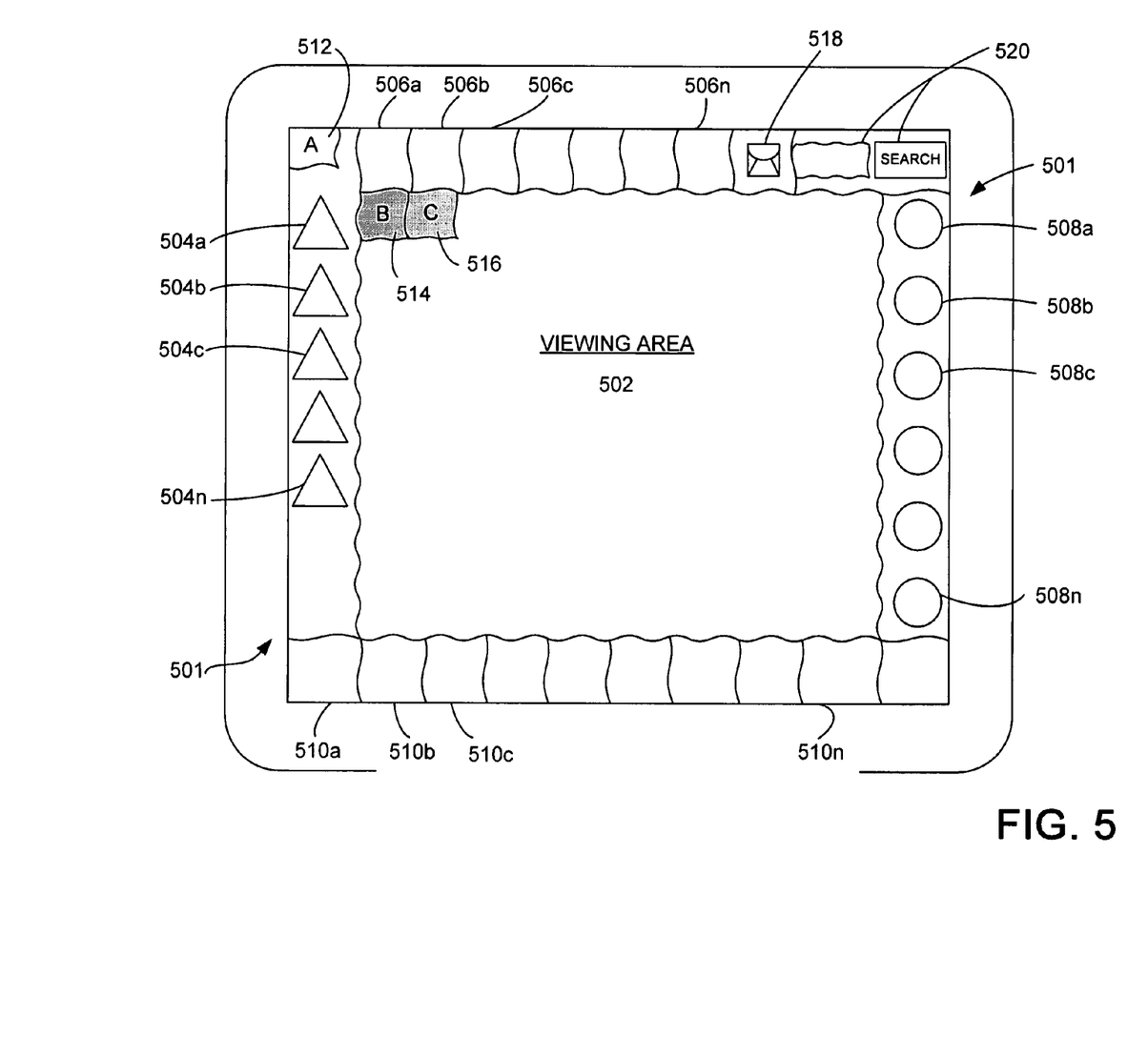
FIG. 5 illustrates an exemplary framed GUI according to another embodiment of the invention.

FIG. 5 illustrates an exemplary framed user interface 501 according to an embodiment of the invention. The framed GUI 501 is arranged in a plurality of sections each containing graphical icons 504a-n, 506a-n, 508a-n, and 510a-n. The graphical icons 504a-n, 506a-n, 508a-n, and 510a-n are representative of user interactive instances that may be activated by selecting the respective icons. Users may customize the framed GUI 501 by adding user interactive instances that achieve individualized preferences. For example, a user may wish to add a graphical icon 518 that may permit immediate access to an email account for the user. In an embodiment, the user may also wish to position a search utility 520 at some position along one of the plurality of sections of the framed GUI 501. The wavy lines along the sections of framed GUI 501 represent a skin (rendition of a custom look-and-feel surface) that a user may choose to adopt.

FIG. 5 illustrates an exemplary multiple framed GUI wherein a user may switch between frames by selecting a corresponding tab 512, 514, or 516 for each frame. Within this example, the current framed GUI 501 is represented by tab "A" 512. On or within the plurality of sections of this frame are multiple graphical icons 504a-n, 506a-n, 508a-n, and 510a-n. A user may switch to a second framed GUI by depressing tab "B" 514. Once tab "B" 514 is selected a user may select user interactive instances on or within a plurality of sections of a second framed GUI. Similarly, once the second framed GUI of tab "B" is activated, a user may further switch to a third framed GUI represented by tab "C" 516 by selecting the graphical icon labeled tab "C" 516, or a user may decide to switch back to the original framed GUI 501 represented by tab "A" 512.

The present disclosure is not to be limited in scope by the specific embodiments described herein. Indeed, other various embodiments of and modifications to the present disclosure, in addition to those described herein, may be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art may recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer system having an operating system, hardware, and software, the computer device system comprising:
a framed user interface module for presenting a framed graphical user interface with a plurality of frames each having a plurality of sections surrounding and adjacent to a workspace area, a respective frame of the framed graphical user interface containing a plurality of application icons in an application access toolbar, each for invoking a corresponding one of a plurality of applications or utilities, wherein the plurality of the sections, on at least two sides of the workspace area, each contain at least one application icon, and wherein one or more of the plurality of application icons appear in geometric positions specified by a user and remain in said geometric positions regardless of which application, if any, is displayed in the workspace area; and
a selection module for receiving a user selection of an application icon of the plurality of application icons; and opening the application or utility corresponding to the application icon;
further comprising a means for launching a plurality of applications or utilities upon start up of the system.

2. A computer system having an operating system, hardware, and software, the computer device system comprising:
a framed user interface module for presenting a framed graphical user interface with a plurality of frames each having a plurality of sections surrounding and adjacent to a workspace area, a respective frame of the framed graphical user interface containing a plurality of application icons in an application access toolbar, each for invoking a corresponding one of a plurality of applications or utilities, wherein the plurality of the sections, on at least two sides of the workspace area, each contain at least one application icon, and wherein one or more of the plurality of application icons appear in geometric positions specified by a user and remain in said geometric positions regardless of which application, if any, is displayed in the workspace area;
a selection module for receiving a user selection of an application icon of the plurality of application icons; and opening the application or utility corresponding to the application icon;
wherein a plurality of the applications or utilities are initiated during start up of the framed graphical user interface and become available through the framed graphical user interface for immediate access.

3. The system of claim 2 wherein, the framed graphical user interface comprises a plurality of layered graphical frames between which the user may switch, wherein when a first frame is displayed the first frame obscures a second frame, and when the second frame is displayed the second frame obscures the first frame.

4. The system of claim 2 wherein, selection of one of the application icons along a frame section activates a sub-frame section containing a plurality of additional application icons related to the selected application icon.

5. The system of claim 2 wherein, the user selection occurs through voice activated commands.

6. The system of claim 2 wherein, the user selection occurs through point-and-click commands.

7. The system of claim 2 wherein, the user selection occurs through physical contact with the framed graphical user interface or surrounding monitor frame.

8. The system of claim 2 wherein, the framed graphical user interface disappears to create a larger workspace area.

9. The computer system of claim 2, wherein the framed user interface module continues to display the plurality of application icons in the plurality of sections of framed graphical user interface after the application or utility corresponding to the user selected application icon is opened in the workspace area.

10. A computer system having an operating system, hardware, and software, the computer device system comprising:
- a framed user interface module for presenting a framed graphical user interface with a plurality of frames each having a plurality of sections surrounding and adjacent to a workspace area, a respective frame of the framed graphical user interface containing a plurality of application icons in an application access toolbar, each for invoking corresponding one of a plurality of applications or utilities, wherein the plurality of the sections, on at least two sides of the workspace area, each contain at least one application icon, and wherein one or more of the plurality of application icons appear in geometric positions specified by a user and remain in said geometric positions regardless of which application, if any, is displayed in the workspace area; and
- a selection module for receiving a user selection of an application icon of the plurality of application icons; and opening the application or utility corresponding to the application icon;
- wherein a portion of the respective frame incorporates, in addition to the plurality of application icons, one or more standard toolbars.

11. A method of interaction with a computer system comprising:
- presenting a framed graphical user interface with a plurality of frames each having a plurality of sections surrounding and adjacent to a workspace area, a respective frame of the framed graphical user interface containing a plurality of application icons in an application access toolbar, each for invoking a corresponding one of a plurality applications or utilities, wherein the plurality of the sections, on at least two sides of the workspace area, each contain at least one application icon, and wherein one or more of the plurality of application icons appear in geometric positions specified by a user and remain in said geometric positions regardless of which application, if any, is displayed in the workspace area;
- receiving a user selection of an application icon of the plurality of application icons; and
- opening the application or utility corresponding to the application icon;
- wherein a plurality of the applications or utilities are initiated during start up of the framed graphical user interface and become available through the framed graphical user interface for immediate access.

12. The method of claim 11 wherein, the framed graphical user interface comprises a plurality of layered graphical frames between which the user may switch, wherein when a first frame is displayed the first frame obscures a second frame, and when the second frame is displayed the second frame obscures the first frame.

13. The method of claim 11 wherein,
- selection of one of application icons along a frame section activates a sub-frame section containing a plurality of additional application icons related to the selected application icon.

14. The method of claim 11 wherein, the user selection occurs through voice activated commands.

15. The method of claim 11 wherein, the user selection occurs through point-and-click commands.

16. The method of claim 11 wherein, the user selection occurs through physical contact with the framed graphical user interface or surrounding monitor frame.

17. The method of claim 11 wherein, the framed graphical user interface disappears to create a larger workspace area.

18. A method of interaction with a computer system comprising:
- presenting a framed graphical user interface with a plurality of frames each having a plurality of sections surrounding and adjacent to a workspace area, a respective frame of the framed graphical user interface containing a plurality of application icons in an application access toolbar, each for invoking a corresponding one of a plurality applications or utilities, wherein the plurality of the sections, on at least two sides of the workspace area, each contain at least one application icon, and wherein one or more of the plurality of application icons appear in geometric positions specified by a user and remain in said geometric positions regardless of which application, if any, is displayed in the workspace area;
- receiving a user selection of an application icon of the plurality of application icons;
- opening the application or utility corresponding to the application icon; and
- launching a plurality of applications or utilities upon start up of the system.

19. A method of interaction with a computer system comprising:
- presenting a framed graphical user interface with a plurality of frames each having a plurality of sections surrounding and adjacent to a workspace area, a respective frame of the framed graphical user interface containing a plurality of application icons in an application access toolbar, each for invoking a corresponding one of a plurality applications or utilities, wherein the plurality of the sections, on at least two sides of the workspace area, each contain at least one application icon, and wherein one or more of the plurality of application icons appear in geometric positions specified by a user and remain in said geometric positions regardless of which application, if any, is displayed in the workspace area;
- receiving a user selection of an application icon of the plurality of application icons; and
- opening the application or utility corresponding to the application icon;
- wherein a portion of the respective frame incorporates, in addition to the plurality of application icons, one or more standard toolbars.

* * * * *

UNITED STATES PATENT AND TRADEMARK OFFICE
CERTIFICATE OF CORRECTION

| | | |
|---|---|---|
| PATENT NO. | : 8,806,363 B1 | Page 1 of 1 |
| APPLICATION NO. | : 11/283711 | |
| DATED | : August 12, 2014 | |
| INVENTOR(S) | : Sonawala | |

It is certified that error appears in the above-identified patent and that said Letters Patent is hereby corrected as shown below:

In the claims,

Claim 10, col. 13, line 15, please delete "invoking corresponding" and insert --invoking a corresponding--; and Claim 11, col. 13, line 38, please delete "plurality applications" and insert --plurality of applications--; and Claim 19, col. 14, line 44, please delete "plurality applications" and insert --plurality of applications--.

Signed and Sealed this
Twenty-first Day of October, 2014

Michelle K. Lee
*Deputy Director of the United States Patent and Trademark Office*